United States Patent
Huang et al.

(10) Patent No.: US 7,583,263 B2
(45) Date of Patent: Sep. 1, 2009

(54) SYSTEM AND METHOD FOR TRANSPARENCY RENDERING

(75) Inventors: Jianbing Huang, Ames, IA (US); Michael B. Carter, Ames, IA (US)

(73) Assignee: Siemens Product Lifecycle Management Software Inc., Plano ( * ) Notice: Subject to any disclaimer, the term of this patent is extended or adjusted under 35 U.S.C. 154(b) by 1000 days.

(21) Appl. No.: 10/731,281

(22) Filed: Dec. 9, 2003

(65) Prior Publication Data

US 2005/0122323 A1    Jun. 9, 2005

(51) Int. Cl.
    *G06T 15/40* (2006.01)
(52) U.S. Cl. .................. 345/421; 345/420; 345/426; 345/589; 382/100; 382/154
(58) Field of Classification Search .......... 345/421, 345/426, 589, 420, 489; 382/100, 154
    See application file for complete search history.

(56) References Cited

U.S. PATENT DOCUMENTS

| | | | |
|---|---|---|---|
| 5,777,621 A | 7/1998 | Schneider et al. | |
| 5,923,333 A | 7/1999 | Stroyan | |
| 6,356,262 B1 | 3/2002 | Klosowski et al. | |
| 6,624,810 B2 * | 9/2003 | Brokenshire et al. | 345/420 |
| 6,912,293 B1 * | 6/2005 | Korobkin | 382/100 |
| 2004/0114794 A1 * | 6/2004 | Vlasic et al. | 382/154 |

OTHER PUBLICATIONS

Joao Comba et al., "Fast Polyhedral Cell Sorting for Interactive Rendering of Unstructured Grids", Computer Graphics Forum, vol. 18, No. 3, Sep. 7, 1999, pp. C369-C376, C427.
J. Foley et al. "Computer Graphics", 1990, pp. 672-680.
J. Bentley, "Programming Pearls", 1986, pp. 107-117.
Robert Sedgewick, "Implementing Quicksort Programs", Communications of the ACM, Oct. 1978, vol. 21, No. 10, pp. 847-857.
Enric Torres, "Optimization of the Binary Space Partition Algorithm (BSP) for the Visualization of Dynamic Scenes", Proceedings of the Eurographics Conference, Sep. 4, 1990, pp. 507-518.
Henry Fuchs et al., "On Visible Surface Generation by a Priori Tree Structures", Computer Graphics, Vil. 14, No. 3, 1990, pp. 124-133.
Henry Fuchs et al., "Near Real-Time Shaded Display of Rigid Objects", Computer Graphics, vol. 17, No. 3, Jul. 1, 1983, pp. 65-72.

* cited by examiner

*Primary Examiner*—Kimbinh T Nguyen
(74) *Attorney, Agent, or Firm*—Michael J. Wallace

(57) ABSTRACT

A system, method, and computer program product that accepts raw polygon geometry and view parameters from the visualization API, sorts the polygons in back-to-front order, and then supplies the sorted triangles to graphics API such as OpenGL.

21 Claims, 9 Drawing Sheets

SYSTEM AND METHOD FOR TRANSPARENCY RENDERING

TECHNICAL FIELD OF THE INVENTION

The present invention is directed, in general, to graphics processing.

BACKGROUND OF THE INVENTION

In many industries, e.g., the aerospace and automobile industries, manufacturers are increasingly relying on visualization technology to interactively view and inspect the product design in order to catch design problems at an earlier stage. The ability to view whole product structures and conveniently inspect each of its sub-systems is considered essential for any visualization system. Therefore it becomes desirable to be able to render a selected subset of parts as transparent to reveal the design details that are otherwise occluded. Moreover, some parts may be made of transparent material such as glass and to render them transparently can substantially increase the realism of the scene. Therefore, providing realistic object transparency at interactive frame rates is important for effective visualization.

In most modern graphics systems, transparency rendering is realized by a process called "alpha blending." For correct transparency, the colors of all the polygons contributing a single pixel must be "blended" in back-to-front order. Since the sorting needs be correctly done for each frame, interactive transparency rendering of large models has been a challenging problem.

Previous proposed triangle sort methods can be classified as two types. One is image-based, and the other is object-based. The image space based methods require the availability of special graphics hardware. In these methods, the transparent polygons are rendered layer by layer along the depth in back-to-front order. The rendering of each layer requires a separate rendering pass, and the number of passes required is the maximum depth of the scene. Additional memory buffers are required to blend each pixel color from different passes. The object space based method sorts all the polygons with respect to the current view direction. These sorted polygons are then supplied to the graphics pipeline in back-to-front order for rendering. Most of the methods in this category were proposed to solve the visibility problem before hardware z-buffer was available. Each of these methods has serious limitations that prevent it from being effectively used for rendering large transparent models. For example, depth sort method have computational complexity $O(N^2)$, while the BSP (binary space partition) sort method requires expensive construction and in-memory maintenance of a large tree structure. Novel approaches are needed to make it possible to render large transparent models at an interactive rate.

Previous work on BSP tree construction focused on a single factor, i.e., to minimize the number of triangles on the final BSP tree, and did not consider other factors that are equally important in practice. These other factors include the time required to build the BSP tree and the expected time to sort the triangles in the BSP tree. To construct a BSP tree in an efficient manner while satisfying different requirements imposed by different factors, although challenging, is crucial to make this approach more practical.

Previous work on depth sort uses occlusion test algorithm that fails to give precise occlusion relationship between a pair of triangles. As a result, view-dependent triangle split may occur even if two triangles are already in correct order. More sophisticated occlusion test algorithm is needed to avoid such unnecessary triangle splits for better depth sort results.

There is, therefore, a need in the art for a system, method, and computer program product for improved transparency rendering.

SUMMARY OF THE INVENTION

A preferred embodiment provides a system, method, and computer program product that accepts raw polygon geometry and view parameters from the visualization API, sorts the polygons in back-to-front order, and then supplies the sorted triangles to graphics API such as OpenGL.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 11, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

A preferred embodiment provides a system, method, and computer program product that accepts raw polygon geometry and view parameters from the visualization API, sorts the polygons in back-to-front order, and then supplies the sorted triangles to graphics API such as OpenGL.

Those of skill in the art will recognize that, although triangles are specifically discussed herein, the disclosed embodiments a can be used with any general planar shapes, e.g., convex or concave polygons, simple or complex, or even curved or procedurally-defined shapes, so long as there exists a method to split them into two or more shapes when cut by a partition plane.

Figure 1:
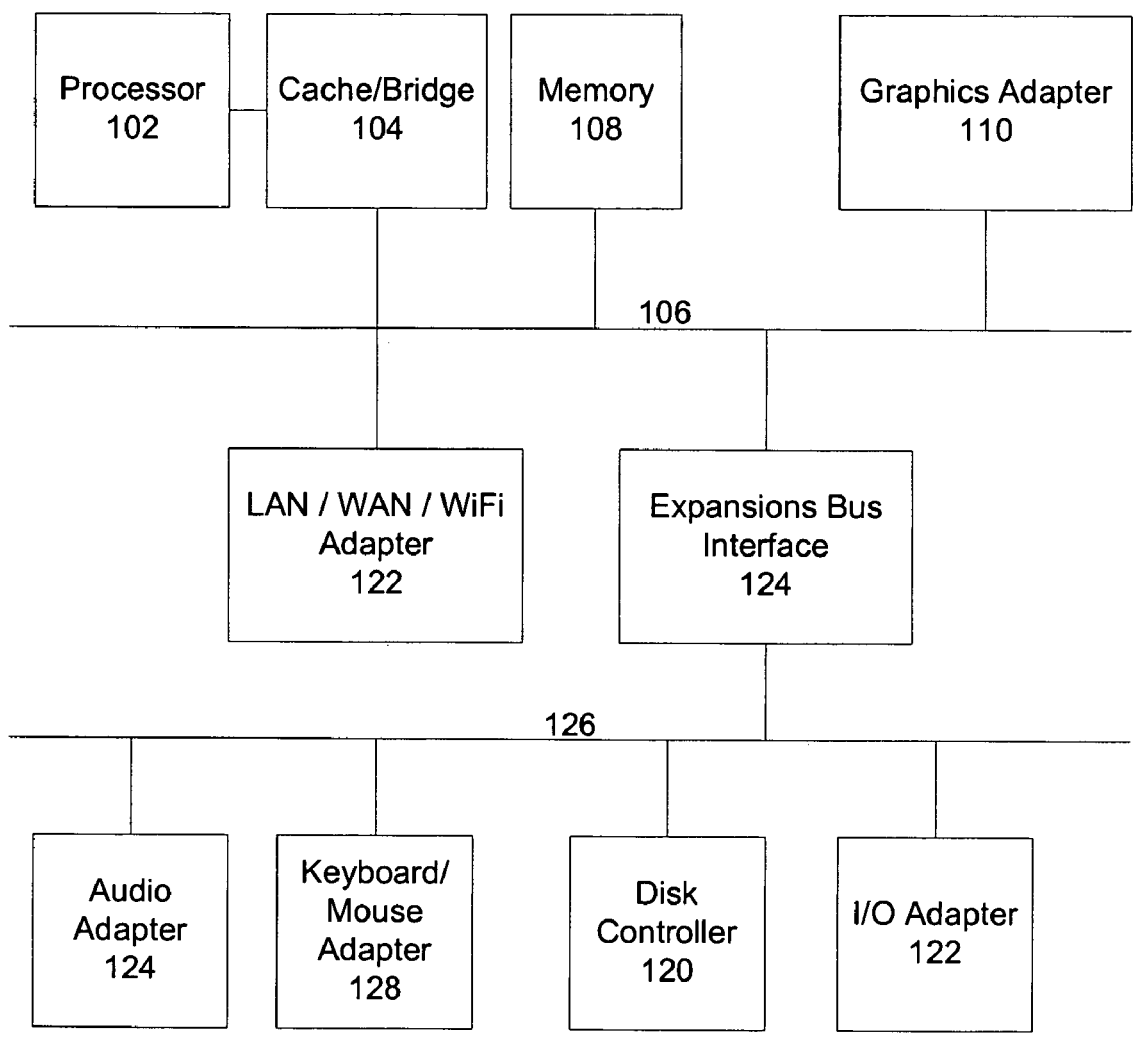
FIG. 1 depicts a block diagram of a data processing system in which various embodiments can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

The preferred embodiments address current existing problems in transparency rendering. The disclosed system, method, and computer program, product works between visualization API and graphics API, as shown in the high-level architecture diagram in FIG. 2.

The system accepts raw polygon geometry and view parameters from the visualization API, sorts the polygons, preferably in a substantially back-to-front order, and then supplies the sorted triangles to graphics API such as OpenGL. In doing to, the disclosed system integrates two traditional sort methods in a novel way to exploit strengths of both, enables substantial improvements to the key algorithms along with a novel caching strategy, and improves system practicality by offering significant flexibility to achieve a spectrum of tradeoffs against multiple factors such as preprocessing time, rendering speed, rendering quality, and memory consumption. The disclosed system has been shown to be able to render large models with up to hundreds of thousands polygons at an interactive frame rate with few artifacts on commonly available graphics hardware.

The characteristics of the BSP sort method complements that of depth sort method. The BSP sort method achieves $O(N)$ complexity by maintaining a huge tree structure in memory. The depth sort method requires little memory overhead, but has very undesirable $O(N^2)$ complexity. The triangle sort algorithm disclosed herein integrates these two methods to exploit the strengths of both. Specifically, in at least some embodiments, a BSP tree is constructed with multiple-triangle leaf nodes (as opposed to a BSP tree with single-triangle leaf nodes as in conventional practices), and the triangles are sorted by traversing the BSP tree and depth-sorting triangles on each leaf node while it is being traversed.

By specifying the maximum number of triangles $\beta$ allowed on a single leaf node, the behavior of the disclosed algorithm can be readily tuned between these two methods to achieve the desired tradeoff between rendering speed and memory consumption. For example, the disclosed algorithm degenerates into traditional BSP sort algorithm if $\beta$ is chosen to be 1, and degenerates into traditional depth sort algorithm if $\beta$ is chosen to be N, the total number of triangles. When $\beta$ is chosen to be a value between 2 and N−1, the behavior of our algorithm is also between these two traditional methods: the sort speed drops but the in-memory tree size decreases with increasing $\beta$. Moreover, the preferred embodiment provides two different modes for the depth sort algorithm to provide additional flexibility between rendering speed and render quality. The advanced mode offers guaranteed correct rendering results, while the basic mode offers better rendering speed with possible artifacts.

Various techniques are disclosed to improve the BSP construction algorithm. In some embodiments, a new criterion is used to evaluate the quality of a candidate partition plane respecting multiple factors important for practical application, and a new method is used to efficiently extract shape knowledge information that facilitates fast selection of good partition planes. Through experimental results, it is shown that the developed BSP construction algorithm can produce high quality BSP trees for 20,000 triangles with about 1 second on a PC with a 1.2 GHz processor.

The known depth sort algorithm is improved herein by developing a sophisticated yet computationally efficient occlusion test algorithm to identify the precise occlusion relationship between a pair of triangles. In this way, unnecessary triangle splits can be eliminated.

Further, a view caching algorithm is disclosed that caches sorted geometry for a discrete set of view directions. With these cached triangle sequences, the transparency rendering can be speeded up by approximating the real triangle sequence of current view direction with the triangle sequence of the closest reference direction that has been cached.

The construction of the BSP tree as a preprocessing step should be as efficient as possible to minimize the latency of the first frame. At the same time, the BSP tree should be as optimal as possible since once constructed it will be used to render every frame thereafter. Previous work in this area focused on a single criterion, i.e., to minimize the number of triangles on the final BSP tree.

The preferred embodiment uses a BSP tree construction algorithm that consists of a new criterion for partition evaluation and a new knowledge-driven algorithm to efficiently choose the best partition plane. The new criterion is derived to accommodate the requirements to shorten both the expected time to sort the triangles in each frame and the time to construct the BSP tree.

The depth-sort algorithm used to sort the triangles on the same leaf node can operate in two different modes using different levels of occlusion test. The basic sort mode sorts the triangles based on their maximum Z coordinates in the view coordinate system. The advanced sort mode performs a more sophisticated occlusion test that guarantees a correct result without splitting triangles, provided that no cyclic occlusion relationship exists.

Figure 2:
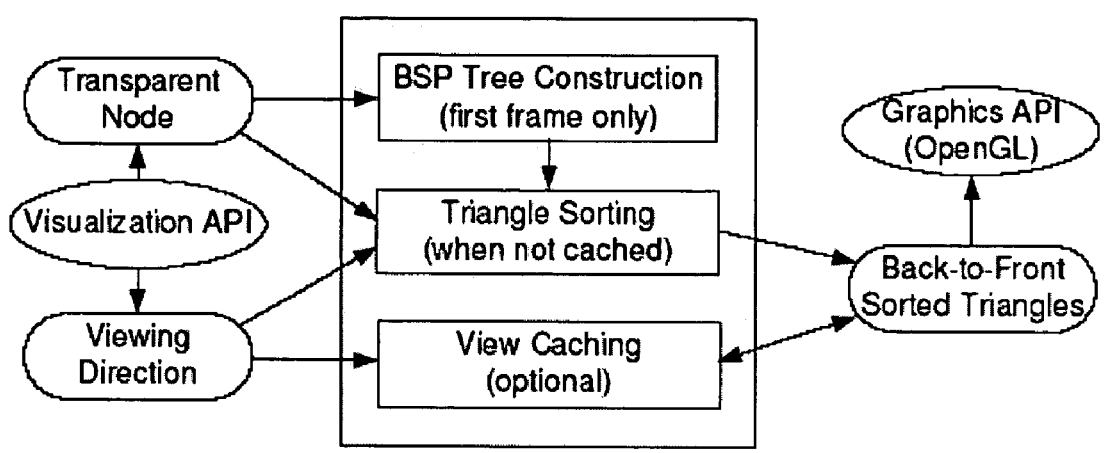
FIG. 2 depicts a high-level diagram in accordance with an embodiment of the present invention.

FIG. 2 depicts an overview of an embodiment of the disclosed transparency rendering software system. The input information to the system is the current view direction and the transparent node supplied from the visualization API. The output information is the back-to-front sorted triangles supplied to the graphics pipeline for rendering. The transparent node is a data structure containing all the transparent triangles to be rendered and may correspond to one or more parts in the scene graph. From the input geometry, a BSP tree is first built at the beginning of the first frame when it does not yet exist. The BSP tree once built is cached on the transparent node and used for the later frames. The transparent triangles, now organized in the BSP tree, are then sorted by the triangle sorting module with respect to current view direction. The sorted triangles, including normal and color information, are supplied to the graphics API (for example OpenGL) for rendering. The view caching module is optional and if enabled, the sorted triangles together with the view direction will be cached on the transparent node. When at a later time the rendering for a close view direction is requested, this cached triangle data can be directly retrieved for rendering with no triangle sorting necessary.

Binary-Space Partition (BSP) tree: For a repetitively used process that deals with a large number of input objects, one important way of improving its efficiency is to construct and maintain a coherent structure among these objects. For example, one frequently used strategy for geometric problems is to recursively use a "divide and conquer" approach to divide a problem of large scale into multiple smaller scale problems that are easier or more efficient to handle. The BSP tree is one such structure, in which each node represents a set of elements located in a 3-dimensional spatial region. Starting with the root node containing all the elements, a partition plane is used to divide the whole Euclidean space into two non-overlapping regions. Those elements cut by the partition plane will be split into two or more elements. For the elements in each region a child node is created which becomes a new leaf node of the BSP tree. This partitioning continues recursively for each leaf node until some pre-set conditions are met.

The BSP tree structure is particularly useful for triangle sorting purposes because the two children of each BSP node are separated by a linear partition plane and therefore the child farther away from the view point cannot occlude the other child. By exploiting this implicit visibility order built in the BSP tree, the visibility sorting of all its nodes can simply be achieved by a tree traversal. Since the BSP tree characterizes the scene geometry and is independent of the view direction, the same BSP tree can be used to obtain the correct visibility order for different view directions as long as the scene content does not change. This is particularly useful for visualization applications with static geometry.

The BSP construction algorithm of the preferred embodiment produces a BSP tree that best facilitates triangle sorting without imposing excessive tree construction time. The only critical variable that affects BSP tree construction is the choice of partition planes at each leaf node to be split. Therefore, the pivotal issues are what criterion should be used to evaluate a candidate partition plane and how the best partition plane can be efficiently chosen. The first issue is addressed herein by choosing a criterion that respects multiple factors such as the tree construction time and the final tree quality, and the second issue is addressed by exploiting extracted shape knowledge to quickly identify the best candidate. Although the following description relates particularly to triangle elements, those of skill in the art will recognize that the disclosed process can be trivially extended to general planar polygons.

Figure 3:
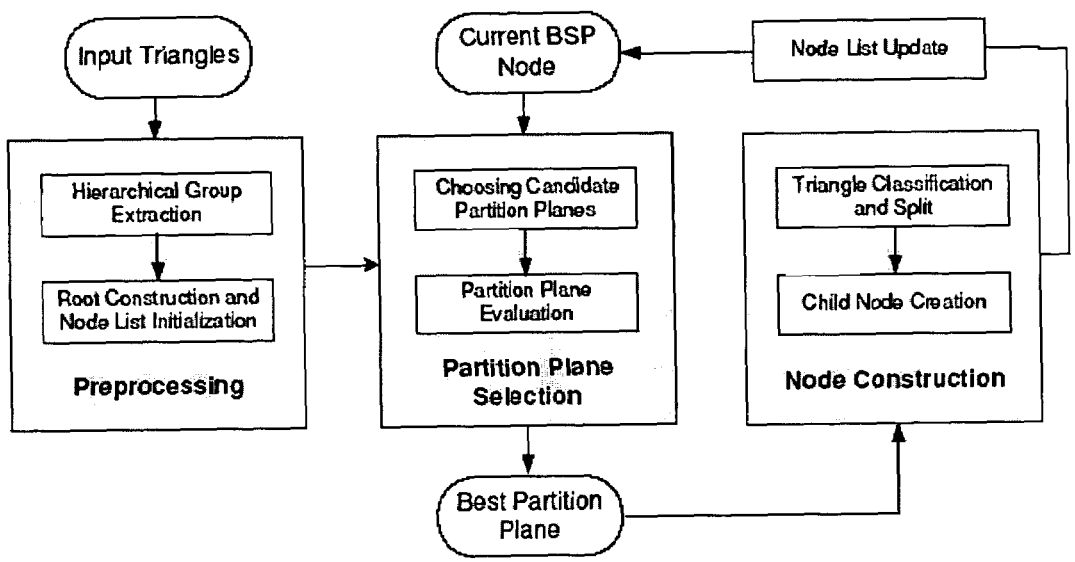
FIG. 3 shows an overview of the a BSP tree construction algorithm.

FIG. 3 shows an overview of the developed BSP tree construction algorithm. The algorithm consists of three steps: preprocessing, partition plane selection and node construction. While the preprocessing step is called only once, the two later steps are repeatedly called for each BSP node to be split. By analyzing the normal and position information of the triangles, the preprocessing step extracts shape knowledge that is used to more effectively choose candidate partition planes. It also creates a root node that contains all input triangles, and initializes the BSP node list to hold it. The node list is a queue type structure that holds all the leaf nodes to be split and the recursive construction process finishes when this list becomes empty. The partition plane selection mechanism is based on the method of hypothesis and test, i.e., a number of candidate planes are chosen and evaluated to decide which one is likely to give the best result. In the node construction step, each triangle is classified against the chosen partition plane and split if it crosses the partition plane. One or two child nodes are then created for the current BSP node. Each newly created child node is appended into the node list if further subdivision is necessary according to a preset criterion.

One issue for the BSP construction algorithm is what criterion should be used to compare different partition planes for a given BSP node containing a set of triangles. According to a preferred embodiment, a partition plane is evaluated with a criterion, denoted as w, that reflects several goals about tree construction time and the quality of the constructed BSP tree. The criterion is designed in a way such that the partition plane having maximum w value should have the best chance of resulting in shorter tree construction time and a better BSP tree.

Table 1 shows parameters used to characterize a candidate partition plane P:

| | |
|---|---|
| $n_O$ | number of triangles on P |
| $n_C$ | Number of triangles crossing P |
| $n_F$ | Number of triangles on the positive side of P |
| $n_B$ | Number of triangles on the negative side of P |

Given a leaf node L containing a set of triangles and a candidate partition plane P, four parameters as shown in Table 1 are used to characterize the quality of P. It is obvious that parameter $n_C$ should have a negative impact on criterion w as those triangles must be split into two or more triangles such that each of them is located on the positive or negative side of plane P. Triangle split in general results in larger tree size and longer tree construction time. Moreover, the increased number of triangles on BSP tree slows down triangle sorting as well.

Those triangles on P can have arbitrary order because they are coplanar, and their order as a whole with respect to the front child and back child of node L can be readily obtained. Since the sorting cost for these triangles is zero, parameter $n_O$ apparently has a positive impact on criterion w.

Figure 4A:
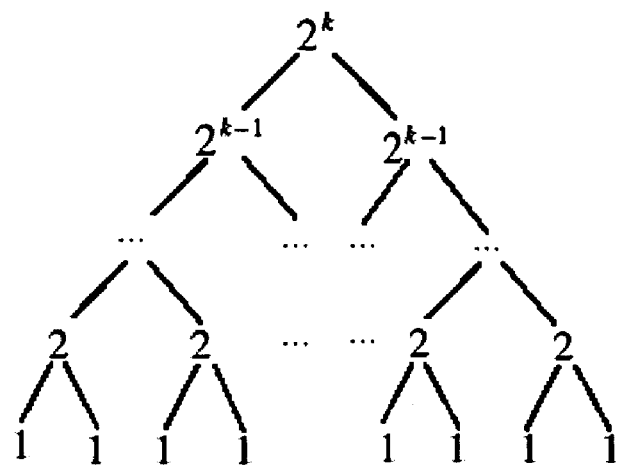
FIGS. 4A and 4B depict balanced and unbalanced tree partitions, respectively.
Figure 4B:
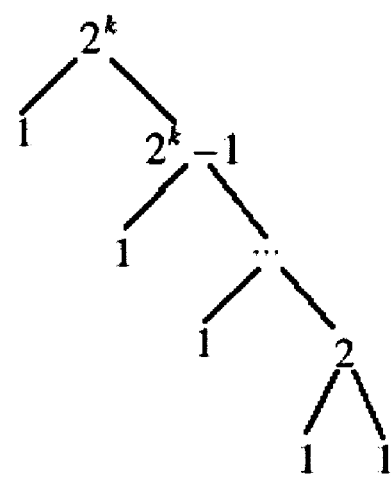

The effect of $n_F$ and $n_B$ on criterion w is much less obvious. The tree balance, i.e., the absolute value of the difference between $n_F$ and $n_B$, is unimportant for the purpose of sorting all the triangles on the BSP tree. However, it is found that the tree balance has a significant impact on the tree construction time because the number of triangles that go through the construction pipeline increases when the tree becomes more unbalanced. This can be best revealed by an analysis for two extreme cases shown in FIGS. 4A and 4B and the comparison between them. FIG. 4A depicts an extremely balanced tree partition, and FIG. 4B depicts an extremely unbalanced tree partition.

For the convenience of explanation, it is assumed that the number of input triangles is $N=2^k$, no triangle split occurs during the construction, and each leaf node contains exactly one triangle. For the balanced partition shown in FIG. 4A, the total number of triangles that need be processed by BSP tree construction pipeline is $T_a=k2^k$, while the same number for the unbalanced partition shown in FIG. 4B is $T_b=2^{2k-1}+2^{k-1}-1$. It can be seen that the ratio of these two numbers $$r = \frac{T_b}{T_a} \approx \frac{N}{2\log_2 N}$$

increases with N.

Although this analysis is based on the ideal and extreme cases, the same conclusion that the balance of every partition significantly affects tree construction time holds for more general cases.

Based on the above analysis, the preferred embodiment uses the following criterion for partition plane evaluation:

$$w = n_O - K_C n_C - abs(n_F - n_B) \quad (1)$$

where $K_C$ is a constant value that indicates the significance of triangle split and symbol abs stands for the absolute value operation. Generally the value of $K_C$ is chosen to be larger than 1 to indicate the fact that triangle split not only slows down current node split operation, it also increases the final tree size and further slows down the tree construction since more triangles need be handled.

From the BSP tree construction pipeline, it can be seen that choosing the right partition plane is an issue that affects both the construction time and the size of the final BSP tree. The evaluation criterion expressed in Equation (1) suggests that the partition plane should be chosen such that more triangles are on it, fewer triangles are cut by it, and the triangles on each side of the partition plane are as balanced as possible. The preferred embodiment organizes the input triangles, in the preprocessing step, into coherent hierarchical groups with each group conveying certain feature or orientation pattern information. Such organized triangles are then used to quickly identify candidate partition planes of high quality.

Figure 5:
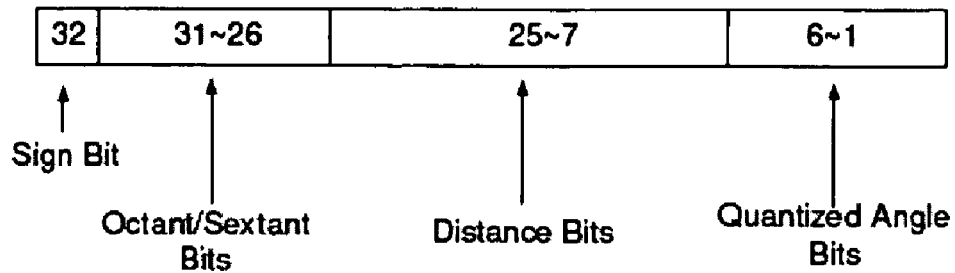
FIG. 5 depicts an exemplary layout of plane index as a 32-bit integer.
Figure 6:
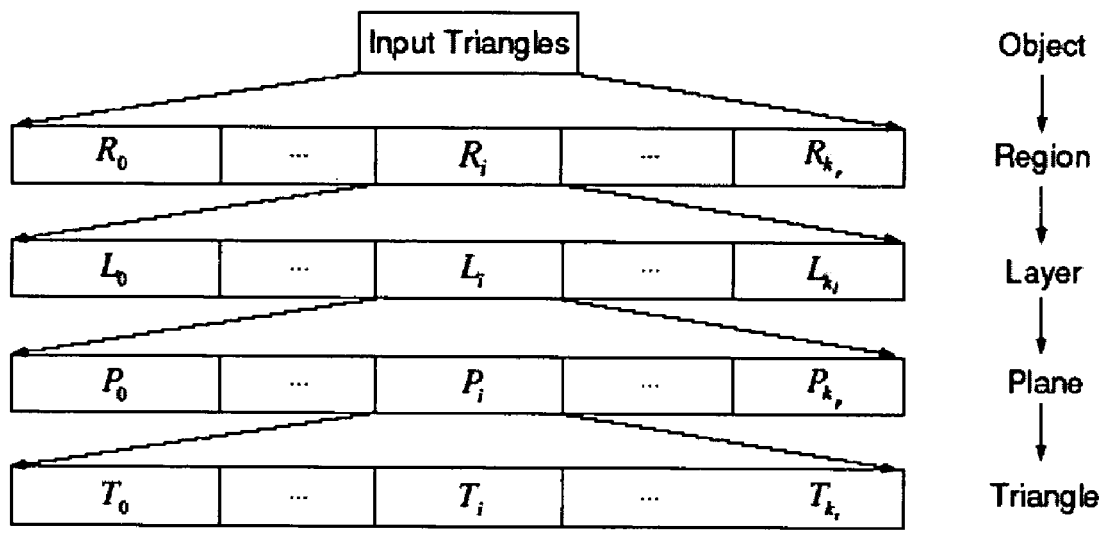
FIG. 6 depicts an example of extracted hierarchical groups.

FIG. 5 depicts an exemplary layout of plane index as a 32-bit integer. FIG. 6 depicts an example of extracted hierarchical groups.

The hierarchical group extraction process has to be very efficient since it is used to expedite the search for good candidate partition planes. One way used to achieve the required efficiency is to represent the triangle information as compactly as possible in order to minimize the information that must be processed. It is well known that a plane can be compactly represented as a 3-dimensional normal vector and a scalar distance along its direction. One alternative method was used to compactly encode a normal vector as an integer. That method takes advantage of the symmetry of the unit sphere such that each normal vector, mapped onto the unit sphere, can be represented with an octant index with value between 0 to 7, a sextant index with value between 0 to 5, and two angle values ranging from 0 to $$\frac{\pi}{4}$$

and 0 to $$\tan^{-1}\frac{\sqrt{2}}{2}$$

radians respectively.

In the preferred embodiments, both the normal vector and the scalar distance of the support plane of each triangle are encoded into a single signed integer that we call the plane index. The plane index is composed of 3 bits to precisely encode each of octant and sextant index, n bits to quantize and encode each of the two angle values, and 25−2*n bits to quantize and encode the distance value, where n is tunable. The layout of the plane index for n=3 is shown in FIG. 5, in which the most significant bit is reserved for sign, the next 6 bits are for octant and sextant values, the next 19 bits are for quantized distance value, and the last 6 bits are for two quantized angle values.

Three groups, namely region, layer, and plane, are to be extracted and the hierarchical relation between them is illustrated in FIG. 6. The extraction process starts with sorting all the triangles with respect to their plane index (in descending order, without loss of generality) into a seed list S. The region groups, each of which contains a contiguous list of triangles in S with the same octant and sextant values are then extracted from list S. From the definition of octant and sextant values, at most 48 regions exist and all the triangles in the same region have roughly the same orientation. As can be seen from FIG. 5, within each region the triangles are sorted by their distance. The triangles having the same distance form a layer, and the layers in the same region are sorted by their distance in descending order. Within each layer, the triangles with the same quantized angle values, and therefore nearly identical orientation, are grouped into a plane. Each plane consists of one or more triangle elements.

The basic strategy for partition plane selection is "hypothesis and test", which compares a selected set of candidate planes and chooses the one with the highest quality. According to the preferred embodiments, the extracted shape knowledge is exploited to quickly select those candidate planes that have the best chance to be a good partition plane as evaluated by Equation (1).

Since most CAD models contain significant planar features, the triangles on the partition plane can be maximized if it is chosen to be the most significant plane feature in the model. Since all the plane features in the transparent object have been extracted as plane groups, the triangle list comprising the most significant plane feature can be simply identified by a linear search. The support plane of one triangle in the list (the first triangle is chosen in this implementation) is then chosen to be one of the candidate partition planes. The significance of a plane feature is defined as the plane group area, i.e., the total area of triangles in the group. This is because that the chance of a triangle being cut by a plane increases with its area and therefore it is better to have triangles with larger area to be on the partition plane.

The next five candidate planes that likely result in least number of triangle cuts and a good balance are then selected and evaluated. Statistically the partition plane that gives least number of triangle cuts should be oriented along the most dominant orientation of the triangles. In addition, the partition plane should be located close to the center of all the triangles in order to achieve good balance between its two sides. The orientation requirement can be satisfied by choosing one candidate from each of the most significant regions with the significance again measured by the group area; typically the five most significant regions are used. The position requirement is fulfilled by choosing the candidate to be a randomly picked triangle from the middle span of the triangle list. Since all the triangles within a single region are sorted by their distance, such chosen candidate planes should result in good balance. In one implementation, the middle span is defined as the collection of those triangles with indices in range $$\left[\frac{N_t}{8}, N_t * \frac{7}{8}\right]$$

where $N_t$ is the number of triangles in the region.

For each of six candidate partition planes, its relation to the triangles is computed. While the relation of a partition plane to a single triangle can be categorized as one of four types: on, crossing, front, and back, its relation to a set of triangles is characterized by four parameters $n_O$, $n_C$, $n_F$, and $n_B$ as shown in Table 1. The relation type of a single triangle to a plane can be readily inferred from the relation of its three vertices to the plane, which in turn is readily computed by a half plane test.

Each of the six chosen candidate planes is the support plane of an input triangle. This has the advantage that at least one triangle won't be cut and should give good result when the shape formed by the triangles is not close to be convex. However, when this shape is nearly convex the chosen partition plane most likely will result in an extremely bad balance and this should be avoided.

The convexity of the shape formed by the triangles us computed using the following formula for each candidate plane:

$$\Delta = n_C + abs(n_F - n_B) \qquad (2)$$

The shape is considered nearly convex if $\Delta \leq T_A$ holds for all six candidate planes where $T_A$ is an integer threshold with value greater than 0. When the shape is found to be nearly convex, additional candidate planes are chosen; in a preferred embodiment, three additional candidate planes are chosen. For this case we experimented with several methods, and found that candidate planes constructed with the following two constraints works well in practice. First, the plane should contain an edge of a randomly chosen triangle such that triangles containing that edge won't be cut. Second, its orientation should be perpendicular to the chosen triangle to improve the chance of getting a better balance. The $\Delta$ value for each of these three candidates is also computed. A candidate is immediately ruled out if $\Delta=0$ to avoid meaningless node splits that can never end.

After the best partition plane has been chosen for the current BSP node, a front child or a back child or both are then created with necessary parent-child links. All the triangles that are on the positive side of the partition plane are put on the front child, while all the triangles that are on its negative side are put on the back child. Those triangles that are on the partition plane will stay on the current node, and those triangles crossing the partition plane will be split into two or three triangles. Each of the split triangles is either added to the front child or back child.

The node construction has been implemented in the way such that the triangles on the current node are processed sequentially to ensure the order of triangles on the same child nodes remains unchanged. For example, if triangle A precedes triangle B in the current node and after node construction they belong to the same child node, then triangle A (or its split triangles) still precedes triangle B (or its split triangles). This way the triangle list in the child nodes is ready for hierarchical group extraction with no further sorting.

The visibility order between the triangles organized in a BSP tree is computed by a back-to-front traversal of the BSP tree with respect to the eye point and a depth-sort procedure at each leaf node when it is being traversed. While the tree traversal sorts all the nodes in the BSP tree, the depth-sort procedure produces the back-to-front sequence for triangles within a single leaf node. Exemplary pseudo-code of the triangle sorting algorithm is given in below, where "inNode" is the input current BSP tree node being sorted, "inEye" is the input position of the eye point, and "outTriList" is the output list of sorted triangles to be computed. For those triangles on the non-leaf nodes, no depth-sort is needed and therefore the sorting cost is much less comparing with those triangles on the leaf nodes. This is the reason why number $n_C$ shown in Table 1 has a positive contribution to the evaluation formula in Equation (1).

```
PROC triangle-sort (inNode, inEye, outTriList)
{
    if(inNode is leaf node){
        tempList = depth-sort(inNode, inEye);
        outTriList.add(tempList);
    }
```

```
        else if(inEye is in the front of inNode.partitionPlane){
            triangle-sort(inNode.back, inEye, outTriList);
            outTriList.add(inNode.onTriList);
            triangle-sort(inNode.front, inEye, outTriList);
        }
        else if(inEye is at the back of inNode.partitionPlane){
            triangle-sort(inNode.front, inEye, outTriList);
            outTriList.add(inNode.onTriList);
            triangle-sort(inNode.back, inEye, outTriList);
        }
        else{ // eye is on node.partitionPlane
            triangle-sort(inNode.front, inEye, outTriList);
            triangle-sort(inNode.back, inEye, outTriList);
        }
    }
```

The disclosed depth-sort algorithm operates in two different modes. In the basic mode, each triangle is simplified as a point and the occlusion relation between a pair of triangles can be computed by comparing their distance to the eye point. Such simplification enables efficient implementations such as QuickSort with O(NlogN) expected time, but the test is too preliminary to guarantee a correct result. Consequently the sorted order can be wrong, which results in artifacts in transparency rendering.

When operating in advanced mode, the depth-sort algorithm formulates final sort list based on the true occlusion relation between a pair of triangles computed by an advanced occlusion test algorithm described in the next section. To form the sort list based on the true occlusion relation, while producing guaranteed correct results, is more complex than basic Z sort. The complexity originates from the fact that occlusion test between triangles A and B in isolation does not completely decide their order in the final back-to-front sorted list. For example, if the occlusion relation between these two triangles is found to be "A does not occlude B" denoted as $A \leq B$, there may exist one or more triangles $C_0, C_1, \ldots, C_n$ that have a chain occlusion relation denoted as $A > C_0 > C_1 > \ldots > C_n > B$ and this dictates that A should precede B in the final list.

Figure 7:
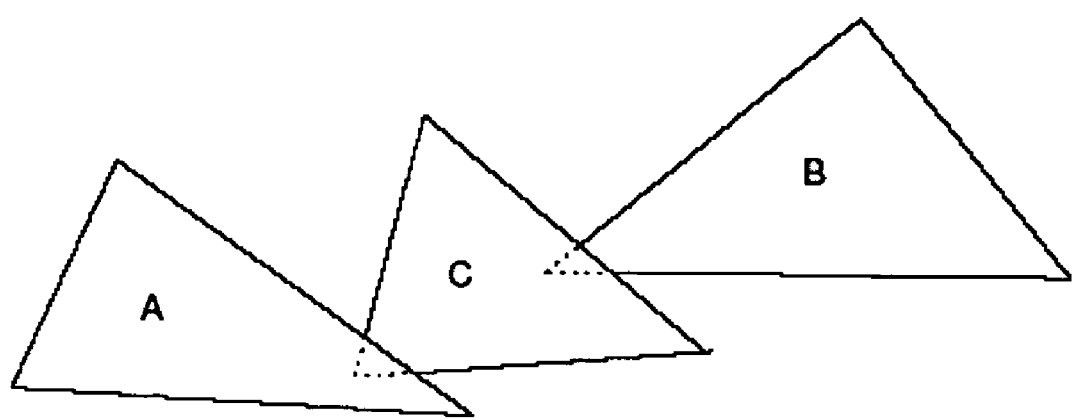
FIG. 7 shows a chain occlusion relation.

FIG. 7 shows the chain occlusion relation illustrated for the case when n=0. In this figure, the "eye point" is from directly above the figure. The direct application of "divide and conquer" paradigm to this kind of sorting problem is difficult, if possible, and generally an algorithm with computational complexity $O(N^2)$ is expected. This computational burden is alleviated in the preferred embodiment since the depth-sort algorithm is only applied to each leaf node of the BSP tree, and the maximum number of triangles on a single leaf node can be controlled.

Without loss of generality assuming A is ahead of B in the original list, the result needed from the occlusion test is whether or not A occludes B. We first use the following four basic tests of increasing complexity [4]. The conclusion "A does not occlude B" can be obtained when any one test succeeds.

1. In view coordinate system, is minimum Z value of A larger than maximum Z value of B ?

2. Does the axis-aligned bounding box of these two triangles in the image space overlap?

3. Does triangle A lie in the opposite side of triangle B as the eye point? 4. Does triangle B lie in the same side of triangle A as the eye point?

In typical CAD models, the model data is usually quite compact in space and frequently none of these basic tests succeeds. Known approaches for handling this case is undesirable since they may result in view-dependent splits even when two polygons are already correctly ordered. The preferred embodiment applies an advanced occlusion test to avoid such splits that would require frequent updates to the cached BSP tree from frame to frame.

Figure 8A:
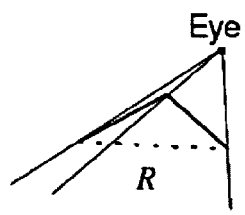
FIGS. 8A-8C show the occlusion region of a triangle in three different forms.
Figure 8B:
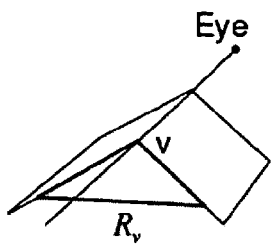
Figure 8C:
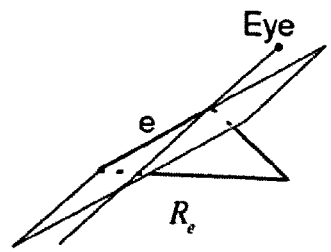

The basic idea of the advanced test is to identify an occlusion point on one triangle, and compute the occlusion relation using a half plane test between this occlusion point and the other triangle. The concept of the occlusion region of a triangle is used to facilitate the selection of such an occlusion point. FIGS. 8A-8C show the occlusion region of a triangle in three different forms depending on its topological relationship with the other triangle. If two triangles are isolated, the occlusion region R is a frustum shape bounded by three planes each of which is formed by the eye point and one of the edges, as shown in FIG. 8A. If a vertex v is shared between these two triangles, the occlusion region $R_v$ has roof shape and is bounded by two planes, each of which is formed by the eye point and one of the owner edges of vertex v, as shown in FIG. 8B. If an edge e is shared, the occlusion region $R_e$ is the half space bounded by the plane formed by the eye point and edge e, as shown in FIG. 8C. All three forms of occlusion region contain the interior of the owner triangle and have the following relation among them:

$$R \subset R_v \subset R_e.$$

FIG. 8A-8C shows a triangle-triangle occlusion region. FIG. 8A shows region R when the other triangle is isolated. FIG. 8B shows region $R_v$, when vertex v is shared. FIG. 8C shows region $R_e$ when edge e is shared. In each figure, the eye point is indicated.

Figure 9:
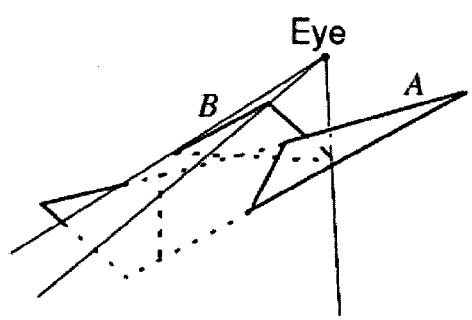
FIG. 9 shows an intersection between a triangle and the boundary of a region.

FIG. 9 shows an intersection between triangle A and the boundary of B-region.

After the occlusion region for triangle A denoted by A-region is constructed, a quick way to locate an occlusion point on triangle B is to test against it each of its non-shared vertices. If no occlusion point is found and if two triangles share an edge, "A does not occlude B". Otherwise, B-region is constructed and the occlusion point is searched from the non-shared vertices on A. If still no occlusion point is found and if two triangles share one vertex, again we have the conclusion that "A does not occlude B". If two triangles are isolated and no vertex in either triangle qualifies to be the occlusion point, we compute the occlusion point by intersecting A with the frustum boundary of B-region. The computed intersection points lie on the frustum boundary and are qualified as the occlusion point. For the case shown in FIG. 9, there are four intersection points. If no intersection point is found, then triangle A does not occlude triangle B. Exemplary pseudo code of an advanced occlusion test algorithm is shown below.

```
PROC occlusion-test (triA, triB)
{
    regionA = construct-region(triA);
    occlusionPt = find-occlusionPt(triB, regionA); if
    (occlusionPt is found) {
        return halfPlaneTest(occlusionPt, triA);
    }
    else if (triA shares an edge with triB) {
        return "triA does not occlude triB"; }
    else {
        regionB = construct-region(triB);
        occlusionPt = find-occlusionPt(triA, regionB);
        if (occlusionPt is found) {
            return halfPlaneTest(occlusionPt, triB);
        }
        else if (triA shares a vertex with triB) {
```

-continued

```
      return "triA does not occlude triB"; }
   else{
      occlusionPt = intersect(triA, regionB);
      if (occlusionPt is found) {
         return halfPlaneTest(occlusionPt, triB);
      }
      else{
         return "triA does not occlude triB";
      }
   }
  }
 }
}
```

Another way to speed up transparency rendering is to cache the sorted triangle list on the transparent node for a finite number of view directions that we call reference directions. Defining the distance between two unit length viewing vectors $\vec{d}_1$ and $\vec{d}_2$ as $d=1-\vec{d}_1 \cdot \vec{d}_2$, the back-to-front triangle sequences for two directions should be close if the distance between them is small. Since the number of reference directions is finite, the back-to-front triangle sequence can be cached for each of them. With these cached triangle sequences, the transparency rendering can be speeded up by approximating the real triangle sequence of current view direction with the triangle sequence of the closest reference direction that has been cached.

Exemplary pseudo code for the disclosed view caching algorithm is shown below. The reference directions chosen in our implementation are evenly distributed on the unit sphere. For the current view direction, the closest reference direction can be identified. If the cached triangle list is unavailable from this reference direction, the triangle-sort operation is performed and the produced triangle sequence is cached onto the reference direction. Otherwise, the cached list is directly retrieved for rendering.

```
PROC view-caching (inNode, inViewDir, outSortedList)
{
   if(refDirList is empty)
      refDirList = constructReferenceDirList( );
   closestRefDir = findClosestRef(inViewDir, refDirList);
   if(cachedTriList is available for closestRefDir) {
      outSortedList = cachedTriList;
   }
   else{
      triangle-sort(inNode, inViewDir, outSortedList);
      cacheList(closestRefDir, outSortedList);
   }
   return;
}
```

With view caching, the frequency that triangle sorting must be performed is reduced and thus the rendering speed is improved. Additional optimization may be achieved by caching graphics data instead of geometric data. For example, display lists instead of triangle lists can be cached onto the reference directions. In this way, necessary rendering operations may also be reduced.

Figure 10:
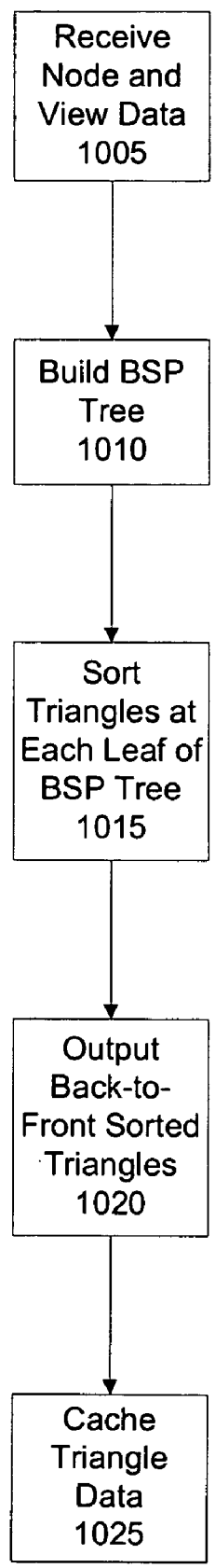
FIG. 10 depicts a flowchart of a process in accordance with a preferred embodiment.

FIG. 10 depicts a flowchart of a process in accordance with a preferred embodiment, corresponding to the detailed process descriptions above. First, the system receives geometry data describing a transparent node and current view direction (step 1005).

Next, the system constructs a binary-space-partition tree, where each transparent triangle is associated with a leaf of the BSP tree (step 1010).

Next, the triangles are sorted into substantially back-to-front order by traversing the BSP tree and sorting the triangles at each leaf (step 1015).

Next, the sorted triangles are output to the graphics API (step 1020).

Finally, the sorted data for the current view, either in triangle form or in display list form, is cached (step 1025).

Figure 11:
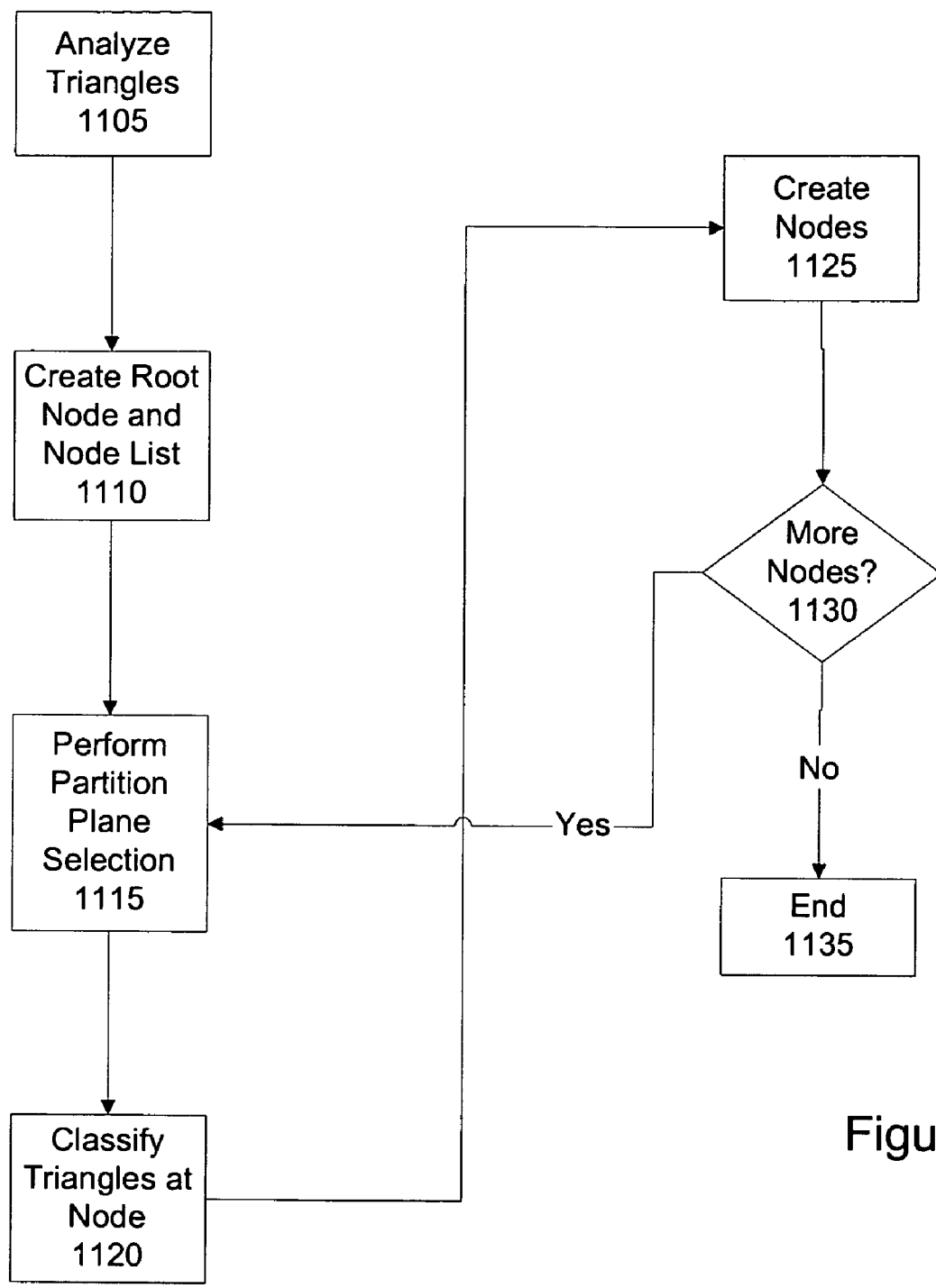
FIG. 11 depicts a flowchart of another process in accordance with a preferred embodiment.

FIG. 11 depicts a flowchart of another process in accordance with a preferred embodiment. This process describes the construction of the BSP tree, as noted above. First, in a preprocessing stage, the system will analyze the shape knowledge of each triangle, including the normal and position information of each triangle (step 1105). Next, the system will create a root node and node list (step 1110).

Then for each node in the tree, the system performs a partition plane selection (step 1115), as described herein. Then, each triangle of the node is classified against the partition plane (step 1120), and according to this classification, child nodes are created (step 1125).

If there are remaining nodes (step 1130), the process repeats (returning to step 1115). If not, the process ends (step 1135), and the next step in the overall process can be performed.

Further background information on graphics processing and rendering can be found in the following texts, all of which are hereby incorporated by reference: Abraham Mammen, "Transparency and Antialiasing Algorithms Implemented with the Virtual Pixel Maps Technique", IEEE Computer Graphics & Applications, 9(4), July 1989, 43-55; Cass Everitt, "Interactive Order-Independent Transparency", White Paper, Nvidia, 2001; Michael Kelley, Kirk Gould, Brent Pease, Stephanie Winner, Alex Yen, "Hardware Accelerated Rendering of CSG and Transparency", Proceedings of the 21st annual conference on Computer graphics and interactive techniques, 1994, 177-184; Newell, M. E., Newell, R. G., and Sancha, T. L., "A Solution to the Hidden Surface Problem", Proc. ACM National Conf. 1972; Henry Fuchs, Zvi M. Kedem, Bruce F. Naylor, "On Visible Surface Generation by a Priori Tree Structure", Proceedings of the 7th annual conference on computer graphics and interactive techniques, July 1980, 124-133; Henry Fuchs, Gregory D. Abram, Eric D. Grant, "Near Real-Time Shaded Display of Rigid Objects", Computer Graphics, Vol. 17, No. 3, July 1983. [7] Michael Deering, "Geometry Compression", Proceedings of the 22nd annual conference on Computer graphics and interactive techniques, September 1995. [8] Foley, J. D., Van Dam, A., Feiner, S. K., Hughes, J. F., "Computer Graphics: Principles and Practice", second edition, Addison-Wesley, 1997.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine-usable medium in any of a variety of forms, and that the present invention applies equally regardless of the particular type of instruction or signal-bearing medium utilized to actually carry out the distribution. Examples of machine-usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for graphics processing, comprising:
   receiving node and view data for a graphic object in a data processing system;
   building a binary-space-partition tree corresponding to the graphic object, the binary-space-partition tree having up to a predetermined number of at least one shape associated with each leaf;
   sorting shapes at each leaf of the binary-space-partition tree; and
   outputting the sorted shapes from the data processing system.

2. The method of claim 1, wherein the shapes are sorted into a substantially back-to-front order.

3. The method of claim 1, further comprising caching the shape data.

4. The method of claim 1, further comprising traversing the binary-space-partition tree.

5. The method of claim 1, wherein the shapes are triangles.

6. The method of claim 1, wherein a configuration component is used, the configuration component balancing the resolution of the binary-space-partition tree against the sorting shapes at each leaf.

7. The method of claim 3, wherein a configuration component is used, the configuration component balancing resource usage against accuracy in the resolution of the caching.

8. A data processing system having at least a processor and accessible memory, comprising:
   means for receiving node and view data for a graphic object;
   means for building a binary-space-partition tree corresponding to the graphic object, the binary-space-partition tree having up to a predetermined number of at least one shape associated with each leaf;
   means for sorting shapes at each leaf of the binary-space-partition tree; and
   means for outputting the sorted shapes.

9. The data processing system of claim 8, wherein the shapes are sorted into a substantially back-to-front order.

10. The data processing system of claim 8, further comprising means for caching the shape data.

11. The data processing system of claim 8, further comprising means for traversing the binary-space-partition tree.

12. The data processing system of claim 8, wherein the shapes are triangles.

13. The data processing system of claim 8, wherein a configuration component is used, the configuration component balancing the resolution of the binary-space-partition tree against the sorting shapes at each leaf.

14. The data processing system of claim 10, wherein a configuration component is used, the configuration component balancing resource usage against accuracy in the resolution of the caching.

15. A computer program product tangibly embodied in a machine-readable medium, comprising:
   instructions for receiving node and view data for a graphic object;
   instructions for building a binary-space-partition tree corresponding to the graphic object, the binary-space-partition tree having up to a predetermined number of at least one shape associated with each leaf;
   instructions for sorting shapes at each leaf of the binary-space-partition tree; and
   instructions for outputting the sorted shapes.

16. The computer program product of claim 15, wherein the shapes are sorted into a substantially back-to-front order.

17. The computer program product of claim 15, further comprising instructions for caching the shape data.

18. The computer program product of claim 15, further comprising instructions for traversing the binary-space-partition tree.

19. The computer program product of claim 15, wherein the shapes are triangles.

20. The computer program product of claim 15, wherein a configuration component is used, the configuration component balancing the resolution of the binary-space-partition tree against the sorting shapes at each leaf.

21. The computer program product of claim 17, wherein a configuration component is used, the configuration component balancing resource usage against accuracy in the resolution of the caching.

* * * * *